United States Patent
Fujii et al.

(10) Patent No.: US 7,538,287 B2
(45) Date of Patent: May 26, 2009

(54) TOUCH PANEL AND MANUFACTURING METHOD THEREOF

(75) Inventors: Shigeyuki Fujii, Osaka (JP); Akira Nakanishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/055,925

(22) Filed: Mar. 26, 2008

(65) Prior Publication Data
US 2008/0237019 A1     Oct. 2, 2008

(30) Foreign Application Priority Data
Mar. 28, 2007   (JP)   ............... 2007-083725

(51) Int. Cl.
*H01H 1/10*   (2006.01)
(52) U.S. Cl. ............ 200/512; 200/600; 200/520; 345/173; 341/34
(58) Field of Classification Search ......... 200/510–512, 200/520, 600, 302.1; 345/173–179; 341/34
See application file for complete search history.

(56) References Cited

U.S. PATENT DOCUMENTS

| | | | |
|---|---|---|---|
| 4,066,854 A * | 1/1978 | Zenk et al. ................. 200/5 A |
| 6,380,497 B1 * | 4/2002 | Hashimoto et al. .......... 200/5 A |
| 6,563,435 B1 * | 5/2003 | Platz .......................... 341/34 |
| 6,621,486 B2 * | 9/2003 | Park et al. ................... 345/173 |
| 7,297,887 B2 * | 11/2007 | Matsumoto et al. ........ 200/314 |
| 2003/0214619 A1 * | 11/2003 | Masuda et al. .............. 349/153 |
| 2004/0263481 A1 * | 12/2004 | Nishikawa et al. ......... 345/173 |

FOREIGN PATENT DOCUMENTS

JP   2005-173770   6/2005

* cited by examiner

*Primary Examiner*—Kyung Lee
(74) *Attorney, Agent, or Firm*—Wenderoth, Lind & Ponack, L.L.P.

(57) ABSTRACT

A first separate area insulated from a top conductive layer and extending in a direction perpendicular to an extending direction of top electrodes is provided near an inner periphery of a spacer on a surface of the top substrate where the top conductive layer is provided. And/or a second separate area insulated from a bottom conductive layer and extending in a direction perpendicular to an extending direction of bottom electrodes is provided near an inner periphery of the spacer on a surface of the bottom substrate where the bottom conductive layer is provided.

7 Claims, 3 Drawing Sheets

TOUCH PANEL AND MANUFACTURING METHOD THEREOF

BACKGROUND OF THE INVENTION

1. Field of the Invention

The present invention relates to a touch panel mainly used to operate a wide variety of electronic equipment and a manufacturing method thereof.

2. Background Art

In recent years, a wide variety of electronic equipment such as mobile phones and car navigation systems has advanced in functions and become diversified. Along with this, equipment like following is increasing in number. That is, to select respective functions of the equipment, a user operates to press down a touch panel by a finger, a pen or the like while viewing a display element such as a liquid crystal display (LCD) device through a light transparent touch panel. The touch panel is attached on the front surface of the display element. Such equipment requires having a highly visible touch panel with reliable operability.

A conventional touch panel of this kind is described with reference to FIG. 3. FIG. 3 shows a cross-sectional view of a conventional touch panel. The drawing is shown on an expanded scale in a thickness direction so that the configuration can be understood easily. The touch panel includes light transparent top substrate 51 and bottom substrate 52. Light transparent top conductive layer 53 made of indium tin oxide or the like is formed on the bottom surface of top substrate 51, and bottom conductive layer 54 is formed similarly on the top surface of bottom substrate 52.

Dot spacers (not shown) made of insulating resin are formed on the top surface of bottom conductive layer 54 with a prescribed distance therebetween. A pair of top electrodes (not shown) are formed on both ends of top conductive layer 53, and a pair of bottom electrodes (not shown) are formed on both ends of bottom conductive layer 54 perpendicularly to the top electrodes.

Frame-like spacer 55 is disposed on the periphery of top substrate 51 and bottom substrate 52 therebetween. Top substrate 51 and bottom substrate 52 are bonded together on their peripheries using adhesive layers (not shown) coated on either or both top and bottom surfaces of spacer 55. The touch panel is thus formed with top conductive layer 53 and bottom conductive layer 54 facing each other with a prescribed clearance.

The touch panel thus formed is disposed on the front surface of a display device such as LCD and is mounted under window frame 57A in housing 57 of electronic equipment. Pairs of the top and bottom electrodes are then connected to electronic circuits (not shown) of the electronic equipment via a wiring board or the like.

In the above configuration, when a user operates to press down a place in the top surface of top substrate 51 by a finger, a pen or the like in response to the indication at the back of the touch panel, top substrate 51 bends down, causing top conductive layer 53 to contact with bottom conductive layer 54 at the pressed place. The electronic circuit then applies voltages to the top electrodes and to the bottom electrodes sequentially. The electronic circuit detects the pressed place by a ratio of the voltage between the top electrodes and the voltage between the bottom electrodes, thereby performing to select a wide variety of functions of the electronic equipment.

At this time, any problem will not occur particularly when the user operates to press down in the center of the top surface of top substrate 51 as indicated by arrow C. In some cases, however, intending to operate to press down near the right or left end of the top surface of top substrate 51, a user may mistakenly press down the top surface of housing 57 as indicated by arrow D, for instance. When a large force is applied on window frame 57A, an end of window frame 57A deforms downward allowing the end of top substrate 51 to bend down, causing top conductive layer 53 to contact with bottom conductive layer 54 near the inner periphery of spacer 55.

In another case, when a relatively large foreign matter such as a dust happens to adhere between an end of the top surface of top substrate 51 and the bottom surface of window frame 57A, the foreign matter will press to bend top substrate 51 downward. Therefore, the end of top conductive layer 53 contacts with bottom conductive layer 54 eventually. Even in the case that the end of top conductive layer 53 contacts with bottom conductive layer due to the reasons described above, the electronic circuit would detect erroneously as if the touch panel is operated to press down, causing an operation error in the electronic equipment.

SUMMARY OF THE INVENTION

The present invention is to provide a touch panel with a simplified structure capable of reliable operation free from errors. The touch panel of the present invention includes a top substrate, a top conductive layer, a pair of top electrodes, a bottom substrate, a bottom conductive layer, a pair of bottom electrodes, and a frame-like spacer. The top conductive layer and the top electrodes are provided on the top substrate, and the top electrodes extend from respective both ends of the top conductive layer. The bottom conductive layer and the bottom electrodes are provided on the bottom substrate, and the bottom conductive layer faces the top conductive layer with a prescribed clearance. The bottom electrodes extend from both ends of the bottom conductive layer in a direction perpendicular to the extending direction of the top electrodes. The spacer is formed on the periphery of the top substrate and the bottom substrate therebetween. A first separate area insulated from the top conductive layer and extending in a direction perpendicular to the extending direction of the top electrodes is provided near an inner periphery of the spacer on a surface of the top substrate where the top conductive layer is provided. And/or a second separate area insulated from the bottom conductive layer and extending in a direction perpendicular to an extending direction of the bottom electrode is provided near an inner periphery of the spacer on a surface of the bottom substrate where the bottom conductive layer is provided. In the touch panel, the pressed place will not be detected even in a case that the end of the top substrate is bent by a force applied mistakenly. Despite the simplified structure, therefore, it can prevent detection errors.

DETAILED DESCRIPTION OF THE INVENTION

Figure 1:
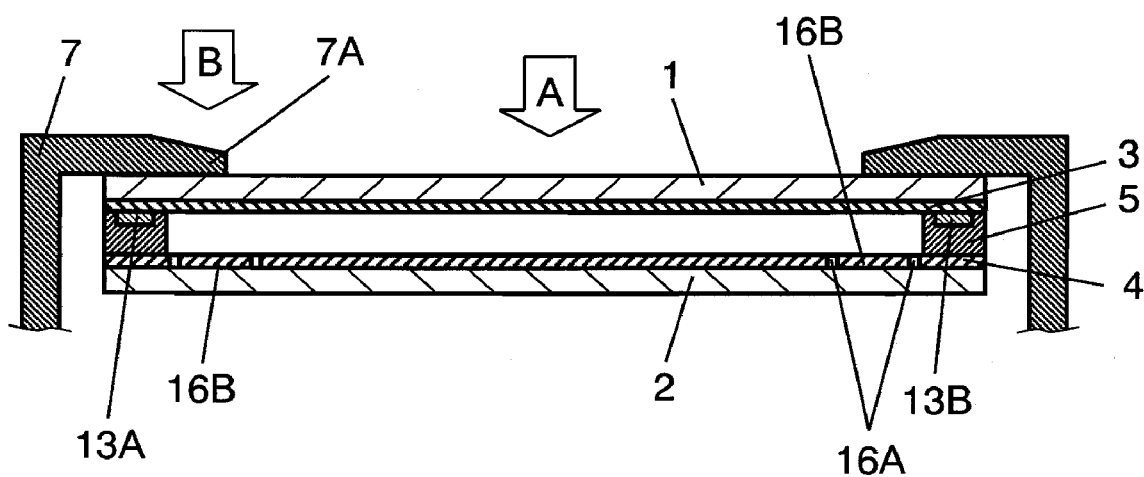
FIG. 1 is a cross-sectional view of the touch panel according to an exemplary embodiment of the present invention.

An exemplary embodiment of the present invention is described with reference to the drawings. A cross-sectional view in the drawings is shown on an expanded scale in a thickness direction so that the configuration can be understood easily.

Figure 2:
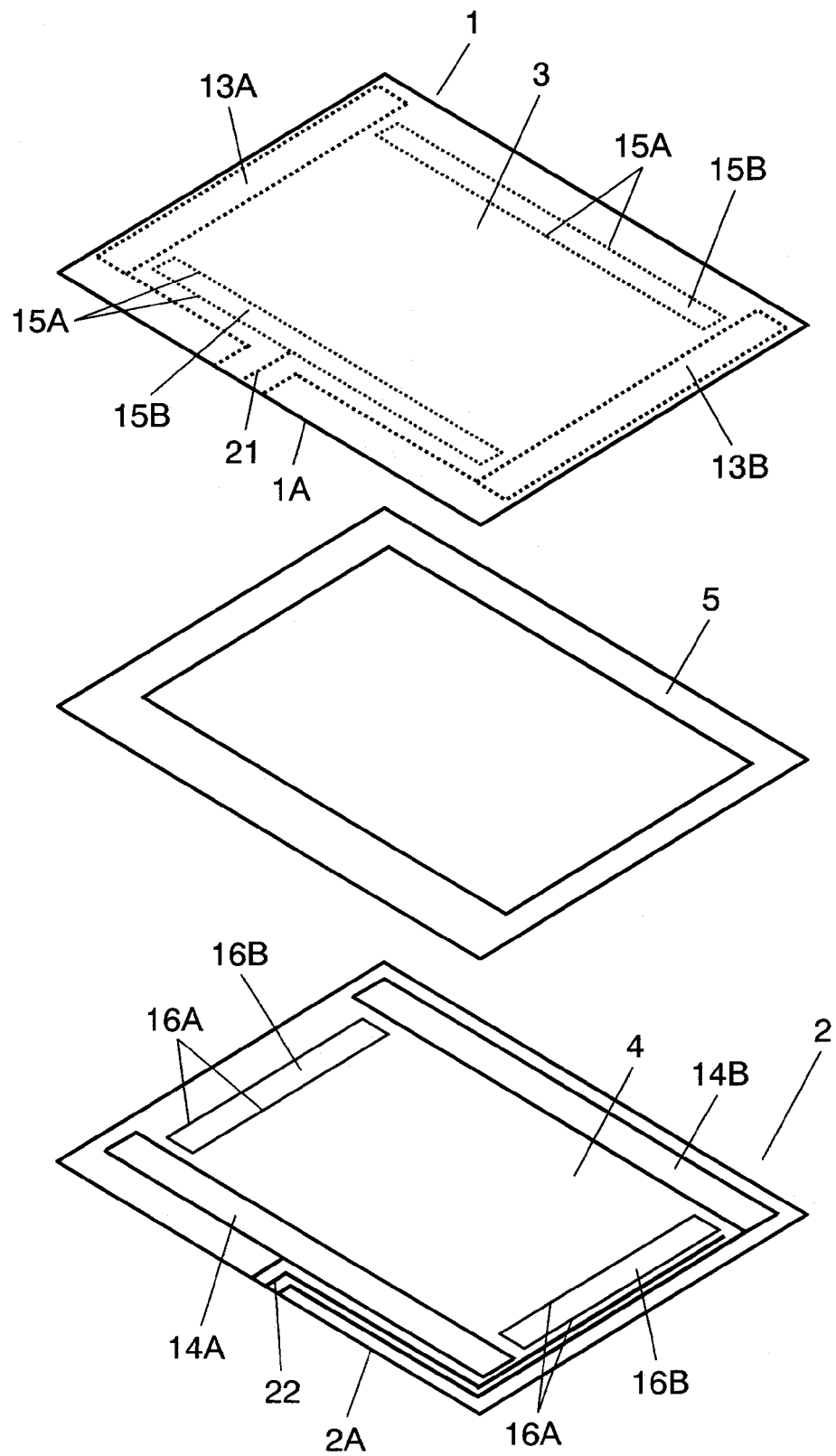
FIG. 2 is an exploded perspective view of the touch panel shown in FIG. 1.
Figure 3:
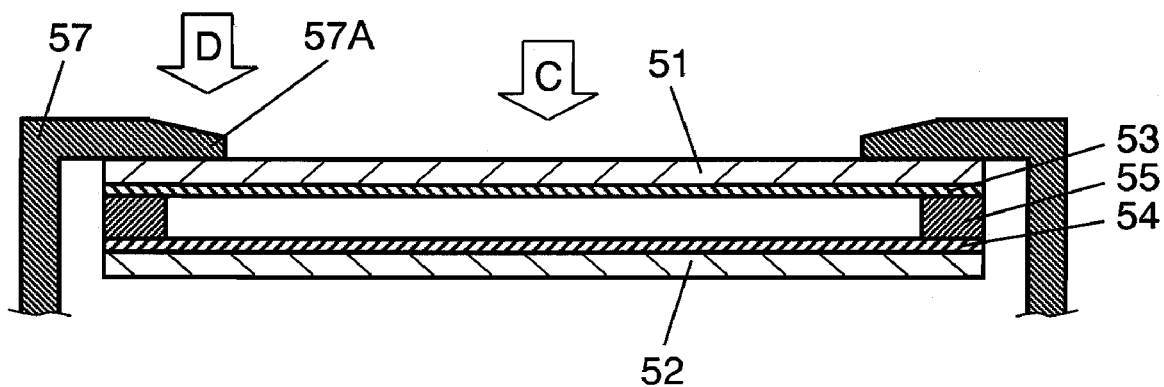
FIG. 3 is a cross-sectional view of a conventional touch panel.

FIG. 1 is a cross-sectional view of the touch panel according to an exemplary embodiment of the present invention, and FIG. 2 is an exploded perspective view of the same. The touch panel includes top substrate 1 and bottom substrate 2, both light transparent. Top substrate 1 is made of polyethyleneterephthalate, polycarbonate, glass or the like. Bottom substrate 2 is made of glass, acrylic, polycarbonate or the like. Light transparent top conductive layer 3 made of indium tin oxide or the like is formed on the bottom surface of top substrate 1 by sputtering or the like, and bottom conductive layer 4 is similarly formed on the top surface of bottom substrate 2.

Dot spacers (not shown) made of insulating resin such as epoxy resin and silicone resin are formed on the top surface of bottom conductive layer 4 with a prescribed distance therebetween. A pair of top electrodes 13A and 13B made of silver, carbon or the like extend from the right and left ends of top conductive layer 3 respectively. A pair of bottom electrodes 14A and 14B extend from the front and rear ends of bottom conductive layer 4 in the direction perpendicular to the extending direction of top electrodes 13A and 13B, respectively. The ends of top electrodes 13A and 13B lead to edge 1A of top substrate 1, and the ends of bottom electrodes 14A and 14B lead to edge 2A of bottom substrate 2.

Frame-like spacer 5 is formed on the periphery top substrate 1 and bottom substrate 2 therebetween. Spacer 5 is made of polyester, epoxy resin or the like. Top substrate 1 and bottom substrate 2 are bonded together on their peripheries using adhesive layers (not shown) coated on either or both top and bottom surfaces of spacer 5. The adhesive layer is made of adhesives such as acrylic resin or rubber. As described above, top substrate 1 and bottom substrate 2 are disposed such that top conductive layer 3 faces bottom conductive layer 4 with a prescribed clearance.

Near the inner periphery of spacer 5, slits 15A are formed on the front and rear ends of top conductive layer 3 by laser machining or the like. Slits 15A surround rectangular separate areas 15B as first separate areas, which are electrically insulated from top conductive layer 3. More specifically, a pair of separate areas 15B are provided on the surface on which top conductive layer 3 is formed, near the inner periphery of spacer 5, and are extending from both ends of top electrodes 13A and 13B, respectively. In other words, separate areas 15B extend in the direction perpendicular to the extending direction of top electrodes 13A and 13B. Top conductive layer 3 is provided with slit 21 connecting edge 1A and one of slits 15A. Slit 21 prevents the lead-out of top electrode 13A from electrically contacting with the lead-out of top electrode 13B. That is to say, slit 21 prevents top electrode 13A from electrically contacting with top electrode 13B on the other place than where top electrode 13A faces top electrode 13B on top conductive layer 3.

Near the inner periphery of spacer 5, slits 16A are similarly formed on the right and left ends of bottom conductive layer 4. Slits 16A surround rectangular separate areas 16B as second separate areas, which are electrically insulated from bottom conductive layer 4. That is, a pair of separate areas 16B are provided on the surface on which bottom conductive layer 4 is formed, near the inner periphery of spacer 5, and are extending from both ends of bottom electrodes 14A and 14B respectively. In other words, separate areas 16B extend in the direction perpendicular to the extending direction of bottom electrodes 14A and 14B. Bottom conductive layer 4 is provided with slit 22 to prevent the lead-out of bottom electrode 14A from electrically contacting with the lead-out of bottom electrode 14B. Slit 22 prevents bottom electrode 14A from electrically contacting with bottom electrode 14B on the other place than where bottom electrode 14A faces bottom electrode 14B on bottom conductive layer 4. The touch panel configuration is thus formed.

The touch panel is disposed on the front surface of a display device such as LCD to be mounted under the window frame 7A in housing 7 of electronic equipment as shown in FIG. 1. Top electrodes 13A and 13B and bottom electrodes 14A and 14B are then connected to electronic circuits (not shown) of the electronic equipment via a wiring board or the like.

In the above configuration, when a user operates to press down a place in the top surface of the top substrate 1 by a finger or a pen in response to the indication of the display device at the back of the touch panel, top substrate 1 bends downward, causing top conductive layer 3 to contact with bottom conductive layer 4 at the pressed place. The electronic circuit applies voltages to the top electrodes of 13A and 13B and to the bottom electrodes of 14A and 14B sequentially. The electronic circuit then detects the pressed place by a ratio of the voltages between the electrodes, thereby performing to select a wide variety of functions of the electronic equipment.

At this time, any problem will not occur particularly when the user operates to press down a place in the center of the top surface of top substrate 1 as indicated by arrow A. Sometimes, however, intending to operate to press down near the right or left end of the top surface of top substrate 1, the user may mistakenly press down the top surface of window frame 7A of housing 7 as indicated by arrow B, for instance. In other cases, when a relatively large foreign matter such as a dust happens to adhere between the end of top surface of top substrate 1 and the bottom surface of window frame 7A, the foreign matter will press to bend the end of top substrate 1 downward, causing the end near the inner periphery of top conductive layer 3 to come close to contacting with bottom conductive layer 4 eventually.

However, separate areas 16B are provided on the right and left ends of bottom conductive layer 4 near the inner periphery of spacer 5. As described above, separate areas 16B extend in the direction perpendicular to the extending direction of bottom electrodes 14A and 14B and are surrounded by slits 16A in a rectangular shape to be insulated from bottom conductive layer 4. Therefore, even if top substrate 1 is bent by a force applied on the right or left end, causing top conductive layer 3 to contact with separate area 16B mistakenly as described above, the pressed place will not be detected. This can prevent detection errors consequently.

Additionally, if top substrate 1 is bent by a force applied on the front or rear end, separate area 15B provided on the bottom surface of top substrate 1 will come close to contacting with bottom conductive layer 4. Separate areas 15B extend in the direction perpendicular to the extending direction of top electrodes 13A and 13B and are surrounded by slits 15A in a rectangular shape to be insulated from top conductive layer 3. Accordingly, top conductive layer 3 will not contact with bottom conductive layer 4 electrically, similarly as described above. This can prevent detection errors consequently.

Typically, separate areas 15B and 16B can be formed by slits 15A and 16A produced by laser beams allowed to move along generally in a rectangular shape while radiating the laser beams continuously on top conductive layer 3 or bottom conductive layer 4. In such laser machining, some crossing on the starting-point and ending-point of laser radiation can produce a reliable insulation of separate area 15B from top conductive layer 3, and that of separate area 16B from bottom conductive layer 4.

The end of window frame 7A of housing 7 is usually formed so as to protrude inward of the order of 1 to 3 mm from inner periphery of spacer 5. Therefore, it is preferable that separate areas 15B and 16B be formed on top conductive layer 3 and bottom conductive layer 4 such that the center lines of separate areas 15B and 16B overlap the end of window frame 7A.

In addition, separate areas 15B and 16B may be formed by a way other than the way of forming slits 15A and 16A. For example, separate areas 15B and 16B may be formed on top conductive layer 3 and bottom conductive layer 4 by etching them. Or, top conductive layer 3 and bottom conductive layer 4 may be formed after making rectangular projections seen from above on positions corresponding to slits 15A and 16A of top substrate 1 and bottom substrate 2 respectively in order to form separate areas 15B and 16B. Furthermore, insulating layers may be provided on places corresponding to separate areas 15B and 16B on top conductive layer 3 and on bottom conductive layer 4, respectively. However, the way to form separate areas 15B and 16B by laser machining has a higher productivity than other ways and is preferable for capability of working precisely.

Additionally, separate areas 15B and 16B may be formed, for instance, in an oval or an elliptical shape other than a rectangular shape. However, to prevent detection errors reliably owing to pressing down the top surface of window frame 7A of housing 7, it is preferable that separate areas 15B and 16B be formed in a rectangular shape.

Either of separate area 15B or 16B may be enough to form depending on the touch panel shape or the like. For instance, if either of the vertical frame and the horizontal frame of window-frame 7A of housing 7 has a bigger mechanical strength than the other, the separate area may not be provided on the stronger side. Moreover, separate areas 15B and 16B are not necessarily provided in a pair. It may be provided only in one side.

Slits 21 and 22 are not necessarily provided if lead-outs of top electrodes 13A and 13B are insulated from top conductive layer 3, and lead-outs of bottom electrodes 14A and 14B are insulated from bottom conductive layer 4. For instance, respective insulating layers may be provided between lead-outs of top electrodes 13A and 13B and top conductive layer 3, and lead-outs of bottom electrodes 14A and 14B and bottom conductive layer 4.

As described above, the touch panel is provided with separate areas 15B and 16B near the inner periphery of spacer 5 on the surface of top substrate 1 where top conductive layer 3 is provided and on the surface of bottom substrate 4 where bottom conductive layer 4 is provided, respectively. Respective separate areas 15B and 16B are surrounded by slits 15A and 16A in a rectangular shape, and are extending to the extending direction of top electrodes 13A and 13B and to the direction perpendicular to the extending direction of bottom electrodes 14A and 14B. Separate areas 15B and 16B are insulated from top conductive layer 3 and bottom conductive layer 4, respectively. The touch panel can perform a reliable operation with a simplified configuration. Therefore, it is useful to operate a wide variety of electronic equipment.

What is claimed is:

1. A touch panel comprising:
   a top substrate;
   a top conductive layer provided on the top substrate;
   a pair of top electrodes provided on the top substrate and extending from both ends of the top conductive layer;
   a bottom substrate;
   a bottom conductive layer provided on the bottom substrate so as to face the top conductive layer with a prescribed clearance;
   a pair of bottom electrodes provided on the bottom substrate and extending from both ends of the bottom conductive layer in a direction perpendicular to an extending direction of the top electrodes;
   a frame-like spacer formed on peripheries of the top substrate and the bottom substrate therebetween; and
   at least one of
      a first separate area insulated from the top conductive layer, the first separate area being provided near an inner periphery of the spacer on a surface of the top substrate, the surface being provided with the top conductive layer, and the first separate area extending to a direction perpendicular to the extending direction of the top electrodes and
      a second separate area insulated from the bottom conductive layer, the second separate area being provided near an inner periphery of the spacer on a surface of the bottom substrate, the surface being provided with the bottom conductive layer, and the second separate area extending to a direction perpendicular to an extending direction of the bottom electrodes.

2. The touch panel according to claim 1, wherein the first separate area is rectangular.

3. The touch panel according to claim 1, wherein the second separate area is rectangular.

4. The touch panel according to claim 1, wherein a slit is provided surrounding the first separate area between the first separate area and the top conductive layer.

5. The touch panel according to claim 1, wherein a slit is provided surrounding the second separate area between the second separate area and the bottom conductive layer.

6. A manufacturing method of a touch panel, comprising:
   A) bonding a top substrate provided with a top conductive layer and a pair of top electrodes extending from both ends of the top conductive layer and a bottom substrate provided with a bottom conductive layer and a pair of bottom electrodes extending from both ends of the bottom conductive layer such that the top conductive layer faces the bottom conductive layer with a prescribed clearance via a frame-like spacer disposed on peripheries of the top substrate and the bottom substrate therebetween,
   and
   B) forming at least one of
      a first separate area insulated from the top conductive layer, the first separate area being provided near an inner periphery of the spacer on a surface of the top substrate, the surface being provided with the top conductive layer, and the first separate area extending to a direction perpendicular to the extending direction of the top electrodes and
      a second separate area insulated from the bottom conductive layer, the second separate area being provided near an inner periphery of the spacer on a surface of the bottom substrate, the surface being provided with the bottom conductive layer, and the second separate area extending to a direction perpendicular to an extending direction of the bottom electrodes.

7. The manufacturing method of a touch panel according to claim 6, wherein at least one of the first separate area and the second separate area is formed by laser machining at least one of the top conductive layer and the bottom conductive layer in the step B.

\* \* \* \* \*